Figure 1:
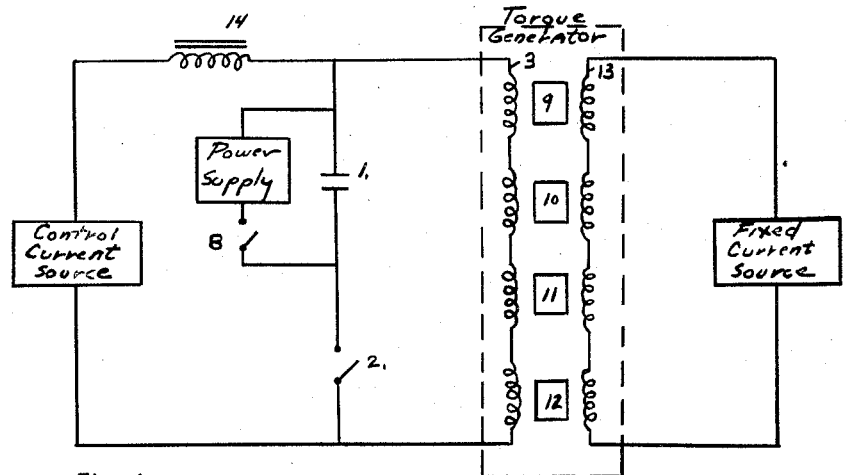

Nov. 8, 1960   P. J. GILINSON, JR   2,959,722
DEMAGNETIZING CIRCUIT FOR ELECTROMAGNETIC APPARATUS
Filed April 25, 1956   2 Sheets-Sheet 1

INVENTOR
Philip J. Gilinson, Jr.
BY
ATTORNEYS

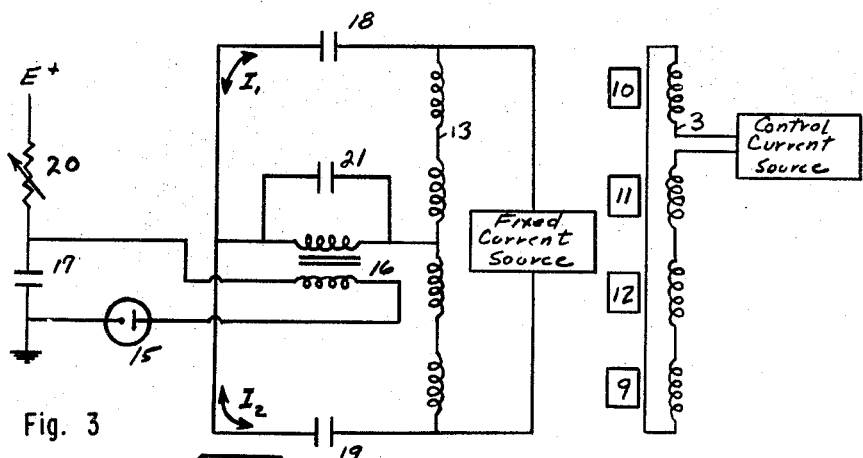
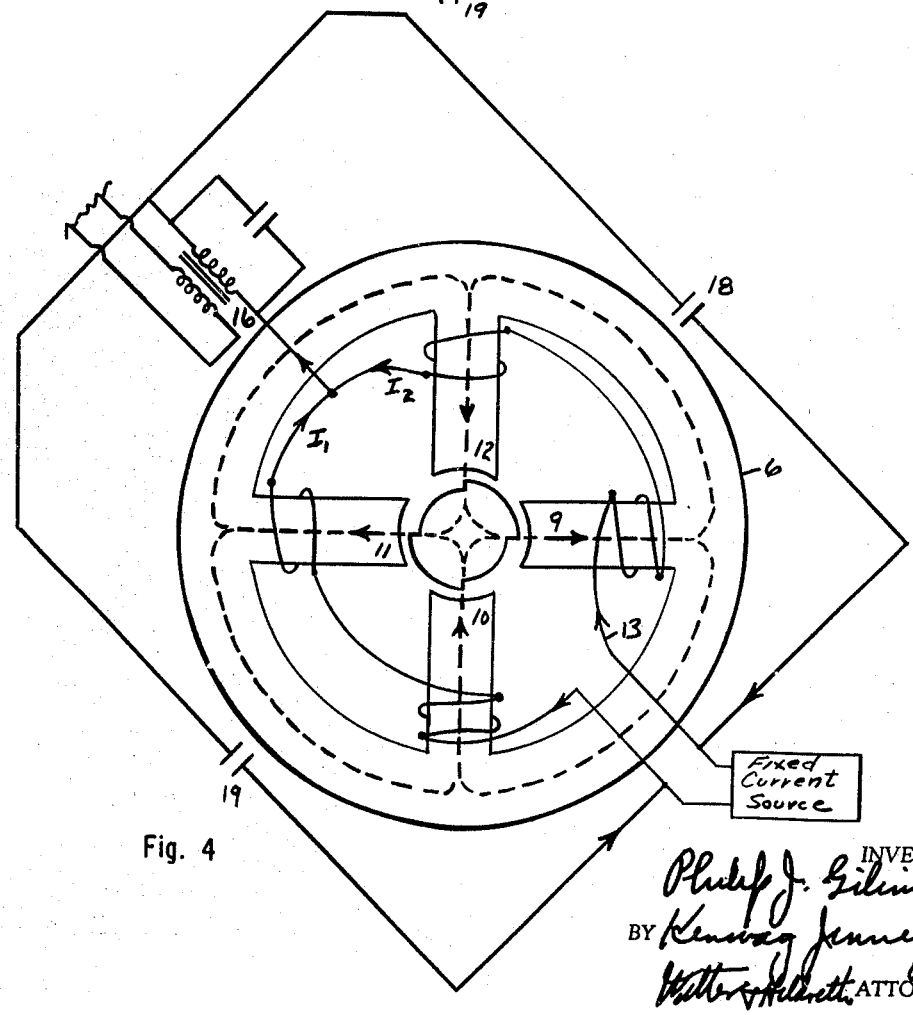

United States Patent Office 2,959,722
Patented Nov. 8, 1960

2,959,722

DEMAGNETIZING CIRCUIT FOR ELECTRO-MAGNETIC APPARATUS

Philip J. Gilinson, Jr., Chelmsford, Mass., assignor to Research Corporation, New York, N.Y., a corporation of New York Filed Apr. 25, 1956, Ser. No. 580,520

8 Claims. (Cl. 318—492)

The present invention relates to electromagnetic apparatus, and more particularly to direct current excited microsyn units known as torque generators and related devices.

As here used, the term "torque generator" refers to a driect current excited motor which is not continuously rotatable and in particular cases is capable of movement through only a relatively small angle, say ten or twenty degrees. Such motors are frequently used in servomechanisms. In some cases they are designed to deliver a constant torque over their full range of movement. In other cases they are designed to deliver a torque which is proportional to the displacement of the rotor from some neutral position. In this latter case the device is referred to as an "Elastic Restraint" generator.

Torque generators usually have the function of accepting a command signal in the form of a current input to the windings and applying a torque proportional to this command signal to a torque summing member, such as a gyro gimbal shaft. After generating a torque in response to a command signal the magnetic components of the torque generator, the stator and rotor, retain an uncertain residual magnetic flux due to magnetic hysteresis. In generators where two sets of windings are used, a fixed winding and a control winding, after the command signal is removed from the control winding the magnetic flux produced by the quiescent current in the fixed winding will be of unpredictable magnitude due to similar magnetic hysteresis effects. Due to this uncertain flux density a torque may be generated when no further command signal is received or a torque of uncertain magnitude may be generated in response to the next command signal. These undesirable torques are at their maximum following the generation of a high torque. They have their most undesirable effects where the high torque generation is followed by a command to generate a small torque or no torque at all.

Many systems which use torque generators require a very accurate sensitivity, that is, an ability to produce a single valued torque output proportional to the input control current. As mentioned above, torque generators which are subject to the effects of magnetic hysteresis are unable, particularly for small torque outputs, to give a predictable output torque in response to a certain command signal.

It is the main object of this invention to eliminate or greatly reduce the uncertain magnetic hysteresis flux in the components of a torque generator, whereby for a fixed quiescent current the linear relationship between output torque and input control current will be single valued for every value of control current.

The reduction or elimination of residual magnetic flux in iron parts by subjecting them to sufficiently high alternating magnetomotive force and then gradually reducing their alternating excitation to zero is well known. In this invention the alternating magnetomotive force is produced by the discharge of an underdamped condenser through the stator windings. A condenser discharging through a torque generator having one set of windings may be considered a simple RLC circuit, where R is the entire circuit resistance, L is the inductance of the windings and C is the capacitance of the condenser. The current $i$ at any time $t$ after the condenser discharge will be alternating in direction if the damping ratio, DR, is less than one.

$$DR = \frac{R}{2}\sqrt{\frac{C}{L}} < 1$$

$R$=resistance in ohms
$L$=inductance in henries
$C$=capacitance in farads where this condition exists the current $i$ flowing at time $t$ is given by the following expression.

$$i = -\frac{W_n q_0}{\sqrt{1-(DR)^2}} \epsilon^{-(DR)W_n t} \sin W_n \sqrt{1-(DR)^2} t$$

where $W_n = \sqrt{1/LC}$ ≡ undamped natural frequency of the condenser discharge circuit in radians per second
$q_0$ ≡ initial condenser charge in coulombs
$t$ ≡ time after condenser discharge in seconds As shown by the above expression, the current flowing in the windings will be continually changing in direction at a frequency of $W_n$. As the current changes direction so does the induced flux in the rotor and stator. The alternating current in the windings with the resulting alternating magnetomotive force produces the desired demagnetization or reduction of the residual flux. As here used, demagnetization means normalizing the relationship between flux and quiescent current by removing the uncertain flux components caused by magnetic hysteresis. The magnitude of the peak currents decreases exponentially as the energy stored in the condenser is dissipated in the resistance R or in hysteresis in each cycle. The result is a gradual reduction in the magnitude of the alternating magnetomotive force finally approaching zero.

Figure 2:
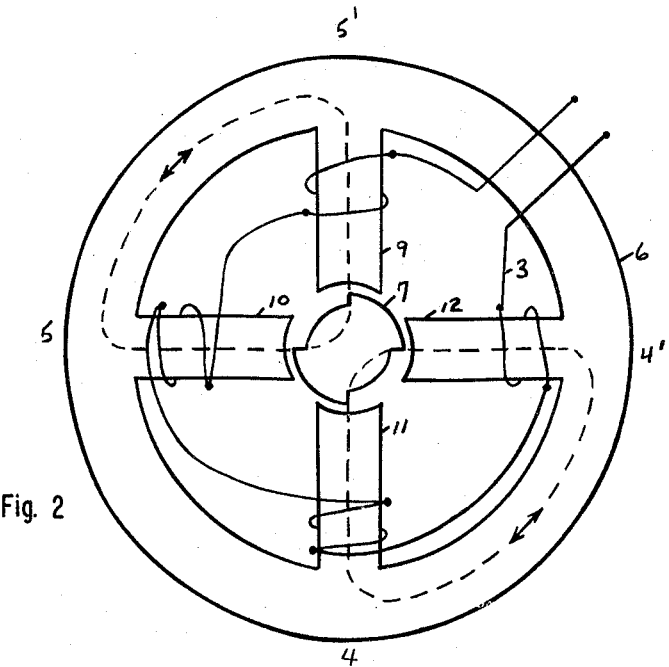

Referring to the drawings illustrating my invention, Figure 1 is a rudimentary schematic circuit diagram of a demagnetizing circuit for a standard double winding type torque generator. Fig. 2 is a partial elevation of a standard double winding type torque generator showing only the control windings and the magnetic components. Fig. 3 is a schematic drawing of the preferred circuit configuration for demagnetizing a standard double winding type torque generator. Fig. 4 is a partial elevation of a standard double winding type torque generator showing part of the demagnetizing circuit illustrated in Fig. 3, the fixed windings and the magnetic components.

Fig. 1 is a schematic circuit diagram showing how my invention may be used to demagnetize a standard double winding type torque generator. In Fig. 1 a condenser 1 is connected across the control windings 3. The first manual switch 2 is serially connected between the condenser 1 and the control windings 3. A power supply, denominated by a labeled box, is connected serially with a second manual switch 8 and parallel to the condenser 1. An inductive choke 14 is serially connected between the control current source, denominated as a labeled box, and the junction formed by the lead connecting the condenser 1 to the control windings 3. The stator poles 9, 10, 11, 12 are represented by rectangles in Fig. 1 and are for simplicity shown as being separate from both sets of windings. The condenser 1 is charged by a power supply which may be used to supply the other components of the torque generator. The manual switch 8 is opened after the condenser 1 is charged, thereby removing the power supply from the condenser-discharge circuit. To receive effective demagnetization by the condenser, the stored energy $$1/2 \frac{q_0^2}{C}$$

must be greater than the amount of magnetic energy stored in the torque generator at the time a maximum torque is applied. The correct charge for a particular application can best be determined experimentally. When the manual switch 2 is closed, the condenser 1 will discharge through the control windings 3. The inductive choke 14 restrains the condenser 1 from discharging into the control current source. As pointed out above, when the capacitor, C, of condenser 1 is of such a value that $$DR = \frac{R}{2}\sqrt{\frac{C}{L}} < 1$$

where R is the torque generator resistance and L is the inductance of the control windings, the circuit composed of the condenser 1 and the control windings 3 will be oscillatory. A plot of current versus time will approximate a simple decaying sinusoid as was the case for a simple RLC circuit. Due to the close physical location of the two sets of windings any oscillatory excitation in the control windings tends to produce sympathetic oscillations in the fixed windings. However, the fixed windings are series opposed; hence no net voltage pulse appears at the fixed winding terminals as a result of the condenser discharge in the control windings.

Fig. 2 is a partial elevation of a standard double winding type torque generator showing only the rotor 7, stator 6 and control windings 3. For simplicity the fixed current windings are not shown. With reference to Fig. 2 it can be illustrated how the oscillatory discharge when applied to the control windings, as illustrated in Fig. 1, will affect the magnetic components of the torque generator. As the current in the control windings changes direction so does the flux in the rotor 7 and stator 6. The dashed line in Fig. 2 represents the path which the flux induced by the current in the control windings 3 takes. As shown in Fig. 2, the alternating magnetomotive force caused by the condenser discharge will demagnetize the rotor 7, the poles 9, 10, 11, 12, and one-half of the stator rim made up of two segments 5 to 5' and 4 to 4'. The flux in the remaining portion of the stator rim is the quiescent flux caused by the current in the fixed windings 13 which are not shown in Fig. 2. Since the fixed excitation generally remains constant during the operation of the torque generator the need to demagnetize these portions of the stator is less. The control excitation changes for each new torque generated. Therefore, the amount of flux in stator segments 4 to 4' and 5 to 5' is subject to more changes, with consequent hysteresis effects, than the remaining portion of the stator rim.

Demagnetizing the torque generator by discharging the condenser through the control windings as shown in Fig. 1, produces a torque output which is dependent on the condenser current and the quiescent current, the control current being zero. The output torque will pulsate rapidly at the condenser discharge frequency $W_n$.

$$W_n = \sqrt{1/LC}$$

The frequency at which the output torque pulse is generally considerably higher than the dynamic response frequency of the equipment associated with torque generator. Hence, the rotor is not generally subject to any angular displacement except a small net disorientation caused by the direct current component of the condenser discharge.

Demagnetization, or normalizing the flux current relationship, of a double winding type torque generator may also be accomplished by discharging the condenser through the fixed windings 13. This has the advantage of generating no output torque due to condenser discharge current when the control current is zero, since the output torque is dependent upon the product of control and quiescent currents. With zero control current no torque will be generated. Should there be a control current flowing its magnitude will generally be much less than the magnitude of the fixed quiescent current. Therefore, the condenser discharge current, when impressed on the fixed windings will generate a smaller output torque than an identical discharge current passed through the control windings, torque being proportional to the product of the currents in each winding. This method has the disadvantage of not demagnetizing stator rim sections 5 to 5' and 4 to 4' shown in Fig. 2.

For demagnetizing a standard double winding torque generator a combination of the above may be used. The condenser discharge current can be passed through the control windings and fixed windings alternatively.

To eliminate any net angular disorientation of the rotor due to a summation of condenser pulses all acting in the same direction, condensers of opposite polarity can be discharged alternatively. The magnitude and direction of the angular disorientation caused by a condenser of one polarity is equal and opposite to the direction of the angular disorientation caused by an identical condenser of opposite polarity. Any resultant angular disorientation produced by one condenser discharge is thereby removed by the following discharge from a condenser of opposite polarity. The net direct current component of the condenser discharge can be entirely removed from the torque generator windings by using an isolation transformer to link the condenser discharge circuit and the torque generator excitation circuit through which the condenser current is to flow. An isolation transformer almost entirely eliminates any impulse torques resulting from the direct current component of the condenser discharge. Care must be taken to obtain a good impedance match between isolation transformer and the appropriate windings of torque generator. The secondary impedance of the isolation transformer matches the impedance of the torque generator winding circuit through which the oscillatory current is to flow.

The circuit configuration shown schematically in Fig. 1 allows a relatively high voltage pulse from the discharging condenser to appear at the control winding terminals. This voltage pulse can be eliminated by using the preferred circuit configuration shown schematically in Fig. 3. In Fig. 3 as in Fig. 1, the torque generator windings 3, 13 and the stator poles 9, 10, 11, 12 are represented as being separate from the stator itself. A voltage source, E+, is serially connected through a variable resistance 20 to the first condenser 17. The primary of the isolation transformer 16 is connected across the terminals of the first condenser 17 and serially connected to a gas switching tube 15. The secondary of the isolation transformer 16 is shared by two equivalent circuits connected in parallel. Each of these equivalent circuits contains blocking condensers 18, 19 which are of equal capacitance and one-half of the fixed windings 13. The condenser 17 is of such capacity that it provides a non-oscillatory pulse of direct current for the duration of the neon glow tube 15 discharge. This direct current pulse excites the primary winding of the isolation transformer 16. The time between condenser discharge pulses depends on the value of the resistance 20 and the magnitude of the positive supply voltage E+. After the neon glow tube 15 discharge, the primary winding circuit of the isolation transformer 16 is open. Coupled with this circuit are symmetrical circuits sharing the secondary of the isolation transformer 16. Each symmetrical circuit contains condensers 18 and 19 which are tuned to an oscillatory damping ratio with the microsyn torque generator fixed winding and the secondary winding of the isolation transformer 16. A trimming condenser 21 is placed across the secondary of the isolation transformer 16 to improve the current wave form of the demagnetizing pulse.

These blocking condensers 18 and 19 also serve the important function of preventing a direct short circuit across the fixed current source and of preventing direct currents from flowing in the secondary of the isolation transformer 16. Because of the symmetry between the oscillatory circuits, the currents, $I_1$ and $I_2$ shown in Fig. 3 will be equal. These sinusoidal decaying oscillatory currents are generated in the secondary of the isolation transformer in response to the direct current pulse resulting from the discharge of condenser 17 through the transformer primary. $I_1$ and $I_2$ will alternate in direction simultaneously. Both flow through different portions of the fixed windings simultaneously but in opposite directions. Consequently, no voltage pulse caused by the flow of currents $I_1$ and $I_2$ will appear at the fixed winding terminals.

Fig. 4 is a partial elevation of a double winding type torque generator showing only the standard fixed winding configuration 13, poles 9, 10, 11, 12, stator 6, and the two symmetrical discharge loops composed of the fixed windings, blocking condensers 18, 19, and the secondary of the isolation transformer 16. From the manner in which the windings are placed on the stator poles, it is evident that the opposing currents $I_1$ and $I_2$ will produce a symmetrical flux pattern through all the magnetic components of the torque generator when the rotor is in a neutral position. In the neutral position the reluctance is equal at all four pole gaps. For one direction of flow $I_1$ and $I_2$ are represented by arrows in Fig. 4. The flux patterns produced by $I_1$ and $I_2$ flowing in the directions indicated are shown as dashed lines. Since $I_1$ and $I_2$ alternate in direction, the direction of the associated magnetomotive force will alternate, thereby producing the desired demagnetization. As indicated in Fig. 4, all parts of the stator rim will be demagnetized. Demagnetization should be performed when the rotor is in or near the neutral position. When not in neutral the condenser discharge will produce a torque proportional to the angular displacement of the rotor. This will be an elastic restraint torque tending to return the rotor to neutral.

This invention has been described and illustrated with reference to the standard double winding type torque generator. Application of this invention to other direct current excited torque generators will be obvious to those skilled in the art.

Having thus described the invention, I claim:

1. In a direct current excited torque generator having at least one winding on each stator pole, a demagnetizing circuit comprising a condenser, an impedance-matching isolation transformer linking said condenser and said stator windings, a source of power connected to charge said condenser, means of periodically discharging said condenser through the primary of said transformer, the impedance presented by said transformer matching the impedance of said stator winding, the capacitance of said condenser and the resistance and inductance of said stator winding being such as to cause a damped oscillatory current flow in said stator windings, thereby removing any residual magnetism from said torque generator.

2. In a direct current excited torque generator having a least two windings on each stator pole, a demagnetization circuit comprising a condenser, an impedance matching isolation transformer linking said condenser and one set of stator windings, a source of power connected to charge said condenser, means of periodically discharging said condenser through the primary of said transformer, said stator windings forming two symmetrically balanced electrical circuits sharing the secondary of said transformer, said symmetrical circuits each containing a blocking condenser, said transformer secondary having a trimming condenser across its terminals, the capacitance of said blocking condensers and the resistance and inductance of said set of stator windings and said transformer secondary being such as to cause a damped oscillatory current to flow through said stator windings thereby demagnetizing said torque generator.

3. In a direct current excited torque generator having at least one stator winding on each stator pole, a demagnetizing circuit comprising a condenser, an impedance matching isolation transformer linking said condenser and said stator windings, a power source connected to charge said condenser, means of periodically discharging said condenser into the primary windings of said transformer, said stator windings forming two symmetrically balanced electrical circuits sharing the secondary of said transformer, said symmetrical circuits each containing a blocking condenser, the capacitance of said blocking condensers and the resistance and inductance of said stator windings and said transformer secondary being such as to cause a damped oscillatory current to flow through said stator windings, the magnitude and direction of said oscillatory current in each half of said stator windings being equal and opposite, thereby producing no voltage pulse across the terminals of said stator windings.

4. In a direct current excited torque generator having at least two stator windings on each stator pole, a demagnetizing circuit comprising a condenser, an isolation transformer linking said condenser and a first set of said stator windings, the primary circuit of said isolation transformer containing said condenser, a switching device in series with the primary windings of said isolation transformer, a source of power connected through a variable resistance to charge said condenser, said switching device periodically permitting a direct-current discharge pulse from said condenser to excite the primary windings of said transformer, the secondary of said transformer being shared by two symmetrically balanced electrical circuits each containing one stator winding on each pole, said symmetrical circuits each containing a blocking condenser, the capacitance of said blocking condensers being such as to cause a damped oscillatory current to flow through said stator windings in response to the condenser discharge through the transformer to demagnetize the torque generator.

5. Apparatus according to claim 4 in which the switching device comprises a discharge tube to cause discharge of the first-named condenser when it is charged to a determined potential.

6. A direct current torque generator comprising a rotor, a stator having a number of poles, a set of fixed current windings and a set of control current windings, each set having in series therewith a resistor and a condenser, an demagnetizing circuit comprising a direct current source having in series therewith a resistor and a condenser, a isolation transformer, connections from said condenser to the primary of the transformer including a switching device operable to discharge the condenser through the transformer when the condenser is charged to a determined potential, and connections from the secondary of the transformer to one set of windings, said secondary connections including at least one condenser to form a resonant circuit to cause a damped oscillatory current flow to occur through said set of windings upon discharge of the first-named condenser.

7. Apparatus according to claim 6 in which the switching device comprises a discharge tube to cause discharge of the first-named condenser when it is charged to a determined potential.

8. Apparatus according to claim 6 in which the connections from the secondary of the transformer are symmetrical circuits connected to different coils of the set, and a condenser is in each of the symmetrical circuits.

References Cited in the file of this patent

UNITED STATES PATENTS

| | | |
|---|---|---|
| 2,351,316 | Borden | June 13, 1944 |
| 2,636,996 | Buess | Apr. 28, 1953 |

FOREIGN PATENTS

| | | |
|---|---|---|
| 97,306 | Sweden | Nov. 7, 1939 |

UNITED STATES PATENT OFFICE
CERTIFICATION OF CORRECTION

Patent No. 2,959,722            November 8, 1960

Philip J. Gilinson, Jr.

It is hereby certified that error appears in the above numbered patent requiring correction and that the said Letters Patent should read as corrected below.

Column 6, line 63, strike out "in series therewith a resistor and a condenser, an" and insert instead -- a coil wound on each pole of the stator, and a --.

Signed and sealed this 25th day of April 1961.

(SEAL)
Attest:

ERNEST W. SWIDER
Attesting Officer

DAVID L. LADD
Commissioner of Patents